Oct. 12, 1943.  W. A. BLACK  2,331,761
POWER AMPLIFIER
Filed Nov. 8, 1940  6 Sheets-Sheet 1

INVENTOR.
WILLIAM A. BLACK
BY
ATTORNEYS

INVENTOR.
WILLIAM A. BLACK

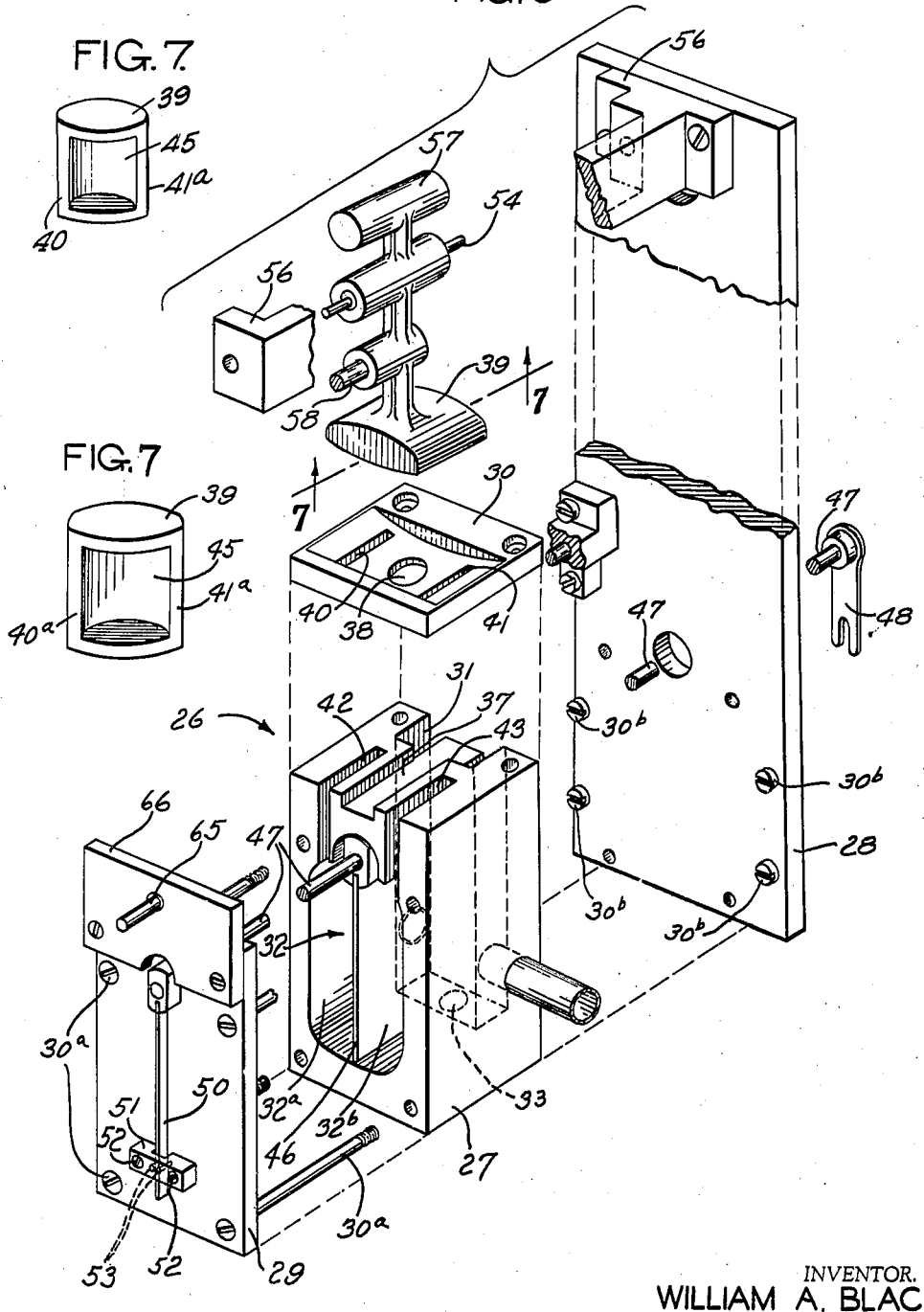

Oct. 12, 1943.                W. A. BLACK                2,331,761
                            POWER AMPLIFIER
                         Filed Nov. 8, 1940            6 Sheets-Sheet 4

INVENTOR.
WILLIAM A. BLACK
BY
ATTORNEYS

Oct. 12, 1943. W. A. BLACK 2,331,761
POWER AMPLIFIER
Filed Nov. 8, 1940 6 Sheets-Sheet 5

INVENTOR.
WILLIAM A. BLACK
BY
ATTORNEYS

Oct. 12, 1943.  W. A. BLACK  2,331,761
POWER AMPLIFIER
Filed Nov. 8, 1940  6 Sheets-Sheet 6

INVENTOR.
WILLIAM A. BLACK
BY Moses & Nolte
ATTORNEYS

Patented Oct. 12, 1943

2,331,761

UNITED STATES PATENT OFFICE 2,331,761

POWER AMPLIFIER

William A. Black, Montclair, N. J., assignor, by mesne assignments, to Reconstruction Finance Corporation, New York, N. Y., a corporation of the United States of America Application November 8, 1940, Serial No. 364,809

17 Claims. (Cl. 74—293)

This invention relates to a power amplifier comprising a relatively high power, rotary mechanism involving a high torque, variably operated, low power, rotary mechanism capable of delivering only a relatively low torque, and mechanical means for causing the high power mechanism to conform in its operation to the operation of the low power mechanism.

In my pending application, Serial No. 284,644, filed July 15, 1939, for Power amplifiers, I have disclosed and claimed a power amplifier of the kind referred to which includes means for compelling a high torque mechanism to depend upon a low torque control member both for its direction and speed of operation, and substantially for its phase of operation.

As specifically disclosed in that application, the high torque mechanism comprises a motor which operates uniformly in a single direction, and includes two slip drive, differential trains equally responsive to the motor and connected in opposed relation to a common output shaft, so that either may predominate over the other in determining the direction and speed of rotation of the common output shaft.

The present invention is in the nature of an improvement upon, or addition to, a mechanism of the kind shown and described in Serial No. 284,644, and is exemplified herein as embodied in a mechanism including substantially the structure of that disclosure. It is to be understood, however, that the present invention is not confined in its utility to specific features or details of the disclosure of my prior application, and that specific reference herein to that disclosure is intended primarily to facilitate exposition of the principle of the present invention.

In the mechanism of Serial No. 284,644 each differential comprises two outlets, one to a common high torque output shaft, and the other to an oil pump which serves as a brake for that outlet. A common valve is provided for inversely controlling the outlets of the oil pumps, so that as the resistance to operation of one of the oil pumps is increased by the valve the other is diminished. The effect of increasing the resistance to operation of an oil pump is to cause the differential train, of which it forms a part, to effect an increased delivery of power for driving the common output shaft in one direction. Since the oil pump outlets are inversely controlled, an increase in delivery of power by one of the differential trains is accompanied by a decrease in the delivery of power by the opposed differential train. The greater the difference between the obstruction of the oil pump outlets, the greater will be the power delivered to the common output shaft. The actuation of the valve is under the joint control of the common output shaft or high torque mechanism and the control shaft of a low torque controlling mechanism. The rotations of the high torque mechanism and the control shaft of the low torque controlling mechanism are combined through differential means for influencing the operation of the valve.

The power amplifier of Serial No. 284,644, as briefly outlined above, is entirely practical and satisfactory for many specific applications. Other applications, however, require the further improvements of the present invention.

The pump control valve of Serial No. 284,644 is subjected to turbulence of the oil as it pours at high pressure from the discharge orifices at the outlet sides of the pumps. This hinders the free movement of the valve and consequently imposes a load on the low torque control shaft. This load, though very small compared to the output torque, is still excessive for many very delicate control applications.

Broadly, it is an object of the present invention to secure a very large gain of power, and particularly to secure sensitive, precise and undeviating responsiveness of a high torque mechanism to a control mechanism which is capable of delivering very little torque.

It is a further object to secure an accuracy of phase correspondence of the high torque output shaft with the low torque control shaft which has not been attainable heretofore.

The need for a mechanism of this character may be illustrated by a single example. In electrically transmitting definite amounts of angular motion from one point to another at present, the most satisfactory means available is the Selsyn type motor. In such a system there are two units; at one end the generator, at the other end the receiver. The receiver motor when precisely synchronized in phase with the generator has absolutely no torque available, and in order to get some torque from it the motor must be slightly displaced from exact synchronism. In order to hold this to a minimum, as little torque as possible should be imposed upon the motor, but this in turn means that an extremely low torque should be made available for controlling the power amplifier.

The problem might be solved after a fashion by connecting in series two power amplifiers of the kind disclosed in Serial No. 284,644. The present invention does in effect involve the utilization of two torque amplifiers in series, but it secures the advantage of power gain, which this idea embodies, in a simpler, more economical and advantageous manner than would be available from the series connection of two power amplifier units as disclosed in Ser. No. 284,644, at the same time achieving a more sensitive and undeviating correspondence of the high torque output with the low torque control than could be achieved by that method.

It is a feature of the present invention that the combined suction of the main amplifier gear pumps is utilized in combination with the high torque output of the amplifier for controlling the valve which affects the outlets of the pumps. Since the pump intake suction as well as the power for rotating the high torque output shaft is delivered from the high torque input shaft, the actuating power for the main amplifier valve is supplied exclusively from the local high torque power source. The combined suction effect of the amplifier oil pumps is substantially constant, and may be of a low order of magnitude as compared with the outlet pressures of the pumps. This suction power, however, though small as compared with the high torque output of the main amplifier is nevertheless adequate for the actuation of the main amplifier valve, and may be of large magnitude as compared with the power input of the low torque control means.

The low torque control means is utilized merely for influencing the magnitude and direction of delivery of the suction power for operating the main amplifier valve. Thus the pre-amplifier is made to include a pre-amplifier control valve which is responsive through differential means to the high torque output shaft and to the low torque control shaft for applying the pump suction to maintain the main amplifier control valve in a neutral position or to swing it in one direction or the other from that position for controlling the main amplifier.

By this means the gain of amplification is secured in two stages: first, the low torque control shaft is utilized for influencing the pre-amplifier valve which is subjected to no turbulence and only to relatively slight forces; and, second, the suction effect of the pumps, controlled by the pre-amplifier valve, is utilized for actuating the main amplifier valve.

Other objects and advantages will hereinafter appear.

In the drawings forming part of this specification:

Figure 6 is an exploded perspective view, partly broken away, which illustrates various details of construction of the pre-amplifier mechanism;

Figure 7 is a face view in perspective of a suction control valve which is utilized in the mechanism;

Figures 1, 2:
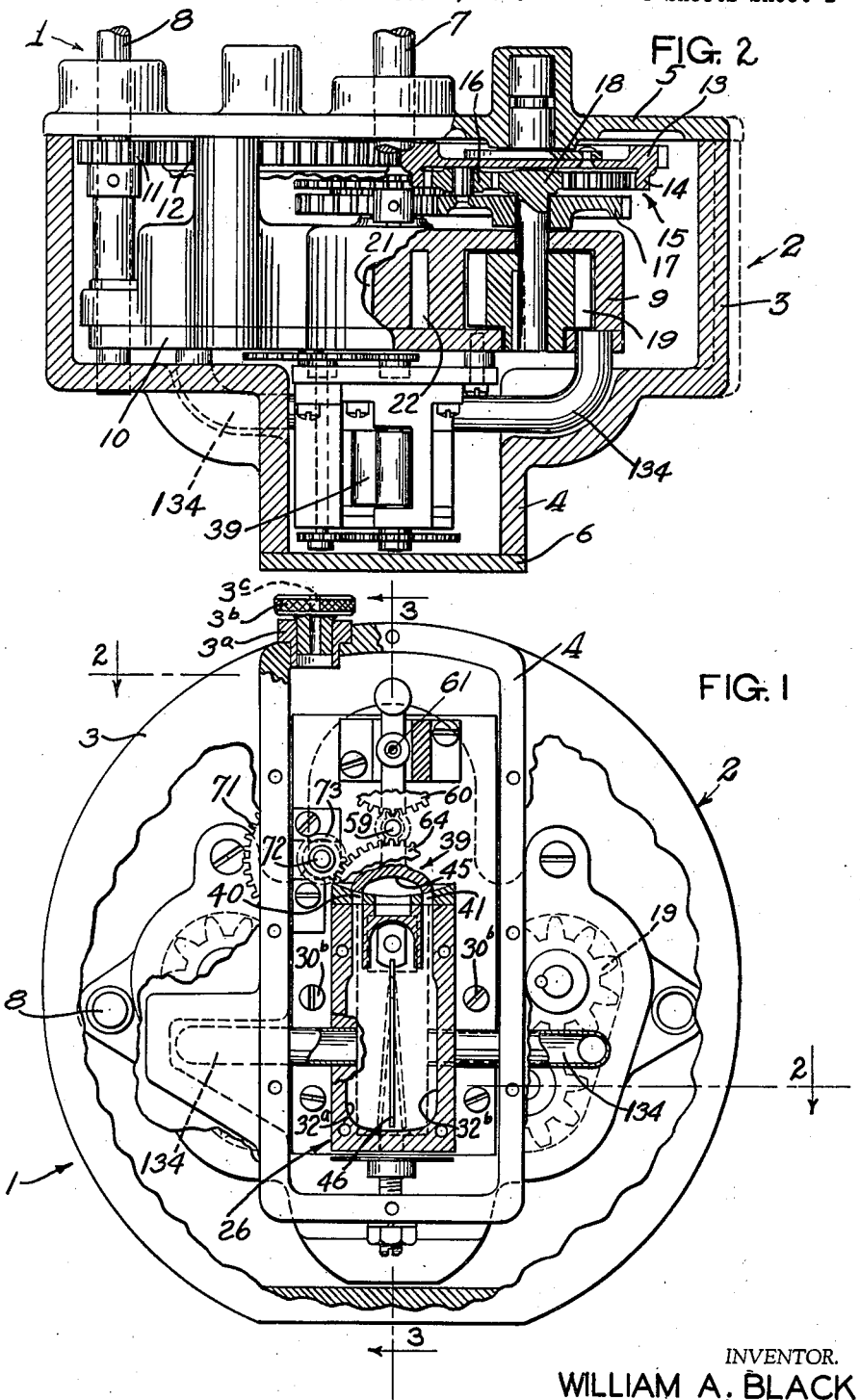
Figure 1 is a view in rear elevation, of an amplifier embodying the present invention, parts being broken away to illustrate details of certain portions of the pre-amplifier mechanism.
Figure 2 is a view partly in horizontal section of the mechanism of Figure 1, the planes of the sectioned portions being generally indicated by the line 2—2 of Figure 1.
Figure 3:
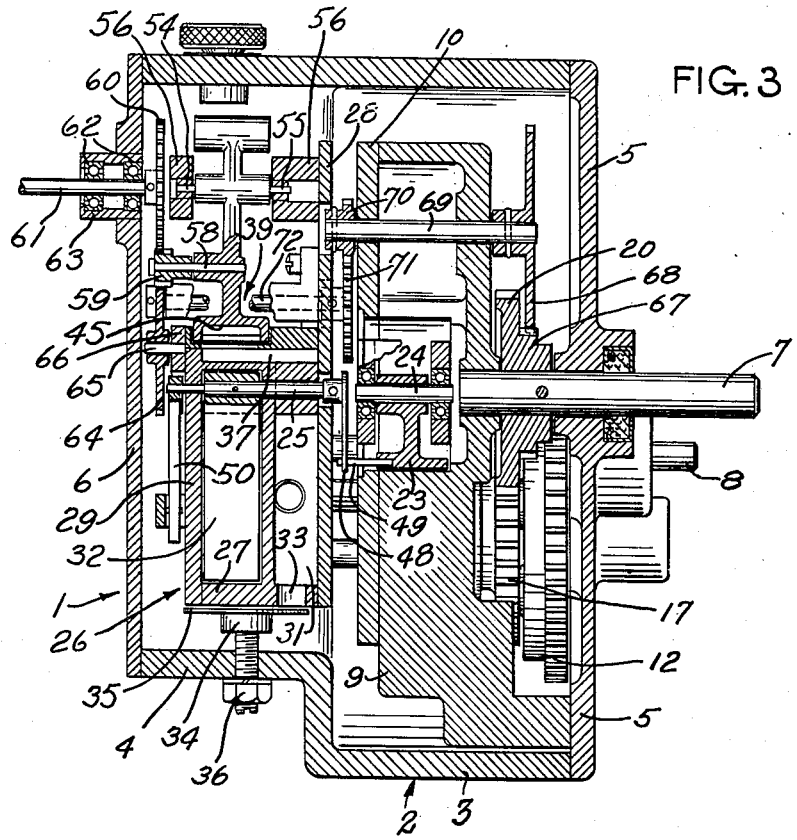
Figure 3 is a longitudinal, vertical, sectional view taken on the line 3—3 of Figure 1, looking in the direction of the arrow.
Figure 4:
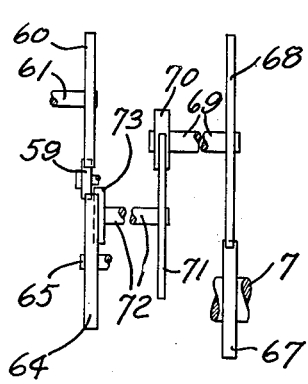
Figure 4 is a schematic or diagrammatic illustration of feedback gearing designed to produce a certain ratio of speed of the low power control shaft and the high torque output shaft for a particular application.
Figure 5:
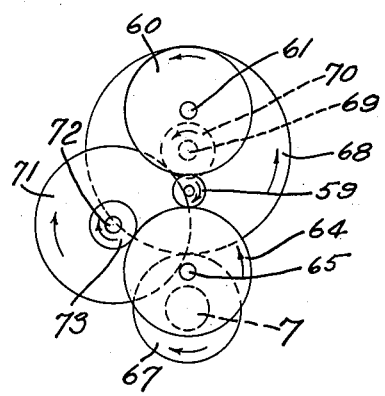
Figure 5 is a diagrammatic view illustrating in front elevation the general arrangement of the feedback gearing of Figure 4.

The mechanism illustrated in Figures 1 to 3, inclusive, combines the main amplifier of Serial No. 284,644 with the pre-amplifier mechanism which is new with the present invention, all in a common casing 1. This casing comprises a main housing member 2 having a generally cylindrical forward portion 3 for housing the main amplifier mechanism and a generally rectangular rearward extension 4 for housing the pre-amplifier mechanism. The casing also includes a front end plate 5 and a rear end plate 6. The casing 1 is filled with oil so that all of the parts disposed within the casing are constantly submerged. The casing member 3 is provided with a filler neck 3a. A removable plug 3b normally closes the neck 3a. The plug 3b is formed with a breather passage 3c.

Figure 8:
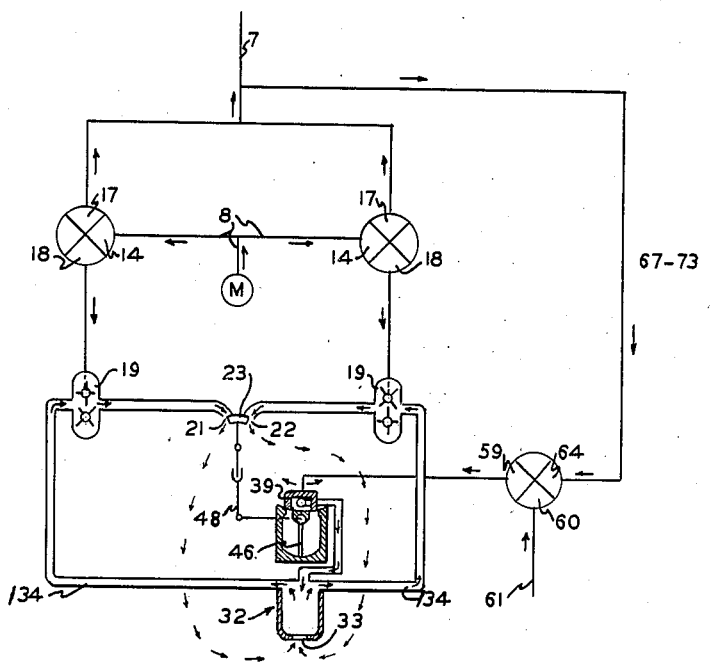
Figure 8 is a diagrammatic view illustrative generally of the principle of the invention.

The illustrative mechanism comprises substantially in its entirety the high torque amplifying mechanism of Serial No. 284,644 which is herein referred to as the main amplifier. Since the object of the entire mechanism to be described is to control the driving of a high torque output shaft 7 from a high power motive device M, Fig. 8, the main amplifier which includes the mechanism for transmitting such drive will first be briefly described.

The main amplifier comprises a fitting or block 9 in which various bearings, chambers and oil passages are formed, and a complementary plate 10. The high torque input shaft 8 of the motive device M is rotated continuously and at a constant speed, and is connected through two opposed slip drive trains to the high torque output shaft in such manner as to apply an extraneously imposed direction and speed of rotation to the high torque output shaft 7.

The shaft 8 has fast upon it a pinion 11 which drives an input gear 12 of one of the opposed trains in one direction and at a fixed speed, and the gear 12, in turn, drives a like input gear 13 of the other of the opposed trains in the opposite direction and at the same speed. The opposed trains are duplicates of one another. A brief description of one of the trains will, therefore, suffice for both.

The gear 13 has fast with it a ring gear 14 which forms one of the gear elements of a differential gear 15. The ring gear 14, which constitutes the input of the differential gear 15, meshes with planet gears 16 carried by an output gear 17. The planet gears 16 also mesh with a sun gear 18 which is the driver for a gear pump 19.

The output gears 17 of the two trains are both in mesh with a gear 20 fast upon the high torque output shaft 7. The high torque input shaft 8 serves to drive the input gears 12 and 13 at equal speeds but in opposite directions, but the output gears 17 of the two trains are always constrained when not at rest to rotate at equal speeds and in the same direction with one another because of their common engagement with the gear 20. Because of this opposed relation of the two trains, no motion is imparted to the output shaft 7 so long as the resistances to operation of the sun gear outputs of the two trains are equal. Unbalancing of these resistances, however, causes motion to be transmitted to the high torque output shaft 7 in one direction or the other according to the direction of the unbalance.

The block 9 and the plate 10 jointly define the chambers for the gear pumps 19 and outlet passages leading therefrom. The gear pump outlet passages terminate, respectively, in outlet ports 21 and 22 as seen in Figure 2. A segmental valve 23 affixed to a shaft 24 is adapted to be shifted in one direction or another from a neutral position for controlling the pump outlet ports 21 and 22 inversely. The pump obstructing valve 23, when in a neutral or central position, partially obstructs each of the outlets 21 and 22, the degrees of obstruction being equal. The valve 23 may, however, be moved toward the left to increase the obstruction of the outlet port 21 while diminishing the obstruction of the outlet port 22, or it may be moved toward the right to increase the obstruction of the outlet port 22, while diminishing the obstruction of the outlet port 21. It is evident, of course, that the power required for thus operating the valve is but a small fraction of the power which the shaft 8 can be caused to deliver to the shaft 7 as a result of such valve operation.

In Serial No. 284,644 the valve corresponding to the valve 23 of the present disclosure is illustrated and described as jointly controlled through differential gearing from a low power control shaft and from a feedback train of gearing operated by the high torque output shaft which corresponds to the shaft 7 herein. In the present application the valve 23 is also responsive to control means comprising a low torque control shaft 25 and a feedback train from the high torque output shaft 7, but such control means does not in this instance act directly upon the valve 23, but upon pre-amplifying mechanism now to be described, and the pre-amplifying mechanism is utilized for operating and controlling the valve 23.

The pre-amplifying mechanism is principally housed in the rectangular extension at the rear of the casing 1. The casing 1 serves as a reservoir for the oil utilized in the oil pumps 19 and in the pre-amplifier. Mounted within the casing extension is a secondary casing 26 (Figs. 1, 2, 3 and 6) which is composed principally of a block 27, front and rear plates 28 and 29, and a top plate 30. The front plate 28 extends considerably above the other elements of the secondary casing to provide bearing and support for certain other parts to be described. Long bolts 30a extend through the plate 29 and the block 27 and are threaded into the plate 28 to hold these elements of the secondary casing together. The plate 28 is affixed to the plate 10 by screws 30b.

The secondary casing 26 is formed with a front chamber 31 and a rear chamber 32. The front chamber 31 constitutes an intake chamber through which all the oil taken in by both of the gear pumps 19 must pass. Oil enters the chamber 31 through an opening 33 formed in the lower end of the block 27, and is delivered from the chamber to the intake sides of the gear pumps through pipes 134. There is thus maintained in the chamber 31 a sub-atmospheric pressure caused by the combined suction effects of the two pumps. While the suction effect of each pump varies in the course of operation of the amplifier, the combined suction effect remains substantially constant because a diminution of suction of one of such pumps is always accompanied by a substantially corresponding increase of suction of the other. The magnitude of this uniform suction effect may be adjusted and set to meet the requirements for a particular application of the amplifier by varying the freedom of access of oil to the chamber 31 through the passage 33.

The size of the opening 33 may be varied in manufacture, but preferably the opening is made of the largest size which would ever be required, and adjustable means 34 is provided for obstructing the hole more or less. Such adjustable means desirably consists of a bolt 34 having a valve plate 35 affixed to the head thereof within the casing 1, the valve plate being supported in position to bear against the lower face of the block 27. The bolt 34 extends downward to the exterior of the casing and is clamped in any desired position of rotative adjustment by means of a nut 36. The threaded end of the bolt 34 is desirably formed with a screw driver slot.

The upper end of the block 27 is formed with a rearwardly extending channel 37 in communication with the chamber 31, which channel is covered by the top plate 30 and closed at its rear end by the back plate 29. The top plate 30 is formed with a central opening 38 which opens into the passage jointly defined by the channel 37 and the top plate 30. The upper surface of the top plate is recessed to provide an arcuate surface upon which a valve 39 is adapted to have smooth and free sliding engagement. The top plate is provided at opposite sides of the opening 38 with passages 40 and 41 which are desirably rectangular in shape as shown. These passages 40 and 41 communicate through slots 42 and 43 with opposite sides of the chamber 32. The open sides of the slots 42 and 43 are closed by the back plate 29.

The valve 39 (see Figs. 1, 6 and 7) is formed as a segment of a cylinder with a rectangular recess 45 in its cylindrical face. In the normal or central position of the valve, the openings 40 and 41, as well as the opening 38 are completely covered by the valve. Neither of the openings 40, 41 is in communication with the opening 38 nor with the atmosphere because the openings 40 and 41 are covered by portions of the valve. The recess 45 extends from the inner edge of the opening 40 to the inner edge of the opening 41, while the outer edges of the valve coincide with the outer edges of the openings 40 and 41, respectively. In other words, the marginal portion 40a (Fig. 7) of the valve covers the opening 40 without overlap, and the marginal portion 41a of the valve covers the opening 41 without overlap.

As soon as the valve is moved clockwise from its central position (as viewed in Figure 6), it begins to uncover the opening 41 to the atmosphere (that is, to oil which is not subjected to anything other than normal atmospheric pressure) and to place the opening 40 in communication with the suction of chamber 31 through the opening 38 and the passage 37. Similarly, when the valve is moved counter-clockwise from its central position, it begins to uncover the opening 40 to the atmosphere and to place the opening 41 in communication with the suction of the chamber 31 through the opening 38 and the passage 37.

The chamber 32 is divided into two chambers 32a and 32b by means of a vane 46. The vane 46 is affixed to a shaft 47 which desirably extends in axial alignment with the high torque output shaft 7. When the valve 39 is moved to place the chamber 32a under sub-atmospheric pressure and the chamber 32b under atmospheric pressure, the vane 46 is moved clockwise (as viewed in Figure 1) and when the valve 39 is moved to place the chamber 32b under sub-atmospheric pressure and the chamber 32a under atmospheric pressure, the vane 46 is moved counter-clockwise.

The shaft 47 has fast upon it a forked arm 48 which extends downward and embraces a pin 49 affixed to the valve 23 of the main amplifier. The valve 23 is thereby operated in unison with the shaft 47 and with the vane 46. A leaf spring 50 affixed to the shaft 47 extends downward at the rear of the back plate 29 for biasing the vane 46 and the valve 23 to their normal or central positions. The spring 50 extends through a channel formed in a block 51, the block 51 being affixed to the outer face of the plate 29 by screws 52. The spring 50 extends between pins 53 which are carried by the channel block 51 and the back plate 29. The pins permit the spring to slide and flex, but do not permit it to swing freely.

From what has been said it is evident that adjustment of the valve 39 is effective to control the application of suction in one direction or the other to the vane 46, and hence the application of the suction force to the actuation of the valve 23. It is worthy of notice in passing that there is virtually no flow of oil through or past the valve 39; also that the unbalance of oil pressures to which the valve 39 is exposed are slight and are in any event applied radially to the valve. The valve 39 may, therefore, be made delicately responsive to very light forces without liability of fluttering, and the valve will be practically immune to any tendency of the valve 23 to produce fluttering. The valve 23, on the other hand, is operated by a substantial suction force which is adequate to control it in a definite and certain manner. Because a substantial force is now made available for the actuation of the valve 23, it is possible to subject the valve to the influence of the fairly stiff stabilizing spring 50. A further feature tending to eliminate flutter of the valve 23 will be pointed out a little farther on.

The valve 39 is fixedly secured to a shaft 54. The shaft 54 is mounted in bearings 55 carried by a bracket 56. The valve is desirably provided with a counterweight 57 at the opposite side of the axis of the shaft 54 from the main body of the valve.

Between the main body of the valve 39 and the shaft 54, the valve is provided with a shaft 58 upon which a pinion 59 is revolubly mounted. This pinion is constantly in mesh with a gear 60 which is fast upon a low power control shaft 61. The shaft 61 is mounted in ball bearings 62 which, in turn, are mounted in a supporting sleeve 63 affixed to the end plate 6 of the casing 1. The shafts 54 and 61 are mounted in axial alignment.

A gear 64 is rotatively mounted upon a shaft 65, the shaft being carried by a mounting plate 66 affixed to the plate 29. The gear 64, driven by a feedback train from the high torque output shaft 7 (to be described presently), meshes with the pinion 59. The gears 60 and 64 are illustrated as of equal diameters. This is not a required relationship, but it is a convenient one, particularly for the purpose of explanation. So long as the gears 60 and 64 are stationary or are rotating in unison, there will be no tendency to shift the valve 39 in either direction about the axis of the shaft 54. Any difference of speeds of the gears 60 and 64, however, will cause the pinion 59 to travel bodily in one direction or the other and hence to shift the valve 39 correspondingly. This explanation holds true, regardless of the driving ratio between the shaft 7 and the gear 64. A gear ratio may be chosen between the shaft 7 and the gear 64 which will cause the synchronized operations of the shafts 7 and 61 to bear any predetermined ratio desired within very wide limits.

It may be assumed initially that the shaft 8 is running at constant speed, that the valves 23 and 39 are in their neutral positions, and that the shafts 7 and 61, hence the gears 64 and 60, are stationary. If now the shaft 61 is rotated in a clockwise direction (as viewed in Fig. 1), the valve 39 will be carried in a clockwise direction so long as the gear 64 does not turn in a clockwise direction at an equal or greater speed. The chamber 32a is thereby connected with the source of suction by the valve 39, and the chamber 32b is exposed to atmospheric pressure. The vane 46 is swung in a clockwise direction by the difference of pressures in the chambers 32a and 32b, and serves to swing the valve 23 in a clockwise direction to unbalance the outlet resistances of the gear pumps 19. This causes the shaft 7 to turn counter-clockwise and to gain in speed until the gear 64 has been caused to acquire a clockwise speed of rotation slightly greater than that of the gear 60.

The gear 64 will not substantially overrun the speed of the gear 60, however. As soon as it does overrun, the valve 39 will be returned toward and through its neutral position, and hence will shift the valve 23 back toward neutral for reducing the unbalance of the resistances of the gear pump outlets. This will quickly retard the speed of the gear 64 to or below the speed of the gear 60. The valve 39 will thus be caused to oscillate briefly, but will soon establish rotation of the gear 64 in unison with the gear 60, whereupon oscillation of the valve will cease.

It is important to notice the difference in operation of the valves 23 and 39. For every uniform speed and prescribed torque load of the shaft 7, the valve 23 has a characteristic position. This is also true of the valve 39, but the departure of the valve 39 from neutral may be minute as compared with the departure of the valve 23 from neutral for a given uniform speed.

The movement of valve 23 is a definite fixed amount determined by the width of the port openings.

The movement of the valve 39 is not fixed and can be adjusted within certain limits. The factors governing the amplitude of the valve movement are as follows:

(a) *Strength of vane centering spring.*—The weaker the spring the less will be the displacement of valve 39 for a given displacement of valve 23.

(b) Magnitude of the suction at valve 39. The greater the suction the less the valve 39 will have to be displaced to produce a given displacement of valve 23.

(c) Leakage at valve 39 and around vane. The less leakage there is the less will be the displacement of valve 39 for a given displacement of valve 23.

By proper proportioning of these factors the required maximum displacement of valve 39 can be made much less than that of valve 23. If, however, the valve movement is cut too fine, the mechanism becomes unstable and oscillation results.

Movement of the valve 39 becomes detrimental in direct proportion to feedback ratio, but fortunately the stability increases as the feedback ratio increases. This enables the valve movement to be cut finer and finer as the feedback ratio is increased, thereby compensating to a certain degree for increased out of phase conditions.

The departure of the valve 39 from its neutral position is a measure of the phase difference of the gears 60 and 64; hence a lack of correspondence of the shafts 61 and 7. If the gear ratio between the shaft 7 and the gear 64 were a 1 to 1 ratio, a difference in phase of 3° between the gears 60 and 64 would represent only a 3° out of phase condition of the shaft 7 which might or might not be serious. When, as illustrated in the present invention, the gearing from the shaft 7 to the gear 64 causes the gear 64 to travel at one-twentieth of the rotary speed of the shaft 7, a 3° out of phase condition of the gear 64 represents a 60° out of phase condition of the shaft 7. It is, therefore, very desirable that the valve 39 shall be caused to deviate as little as possible from its neutral position when the gears 60 and 64 are running in synchronism. The fact that the valve 39 is capable without substantial deviation from its neutral position of maintaining synchronism at any speed represents, therefore, an important advantage of the present invention, particularly when the amplifier is used for securing simultaneously a multiplication of power and a multiplication of speed as in the illustrative instance. The foregoing discussion is not, however, to be construed as minimizing the advantage of holding the shaft 7 as closely as possible to its proper phase relation to the shaft 61 under any and all relative speeds of the two shafts for which the amplifier may be designed.

Both of the chambers 32a and 32b are always full of oil, and are always nearly closed and sealed. Since the oil is incompressible, any impulse tending to disturb the position of the valve 23 is opposed and retarded, a dashpot effect being produced because the oil can only pass the vane 46 and the openings of the nearly closed chambers 32a and 32b very slowly. Sudden displacement of the vane 46 and the valve 23 by the surging or turbulence of the oil acting on the valve 23 is, therefore, minimized. This dashpot effect is present and exerts a steadying influence upon the valve 23 under all normal conditions of operation.

It has been mentioned that the drive train from the shaft 7 to the gear 64 causes the rotary speed of the gear 64 to be one-twentieth of the rotary speed of the shaft 7. This speed reduction ratio has, of course, been chosen merely for illustrative purposes, although it is practically useful in some instances. The gear train referred to comprises a gear 67 fast on the shaft 7. The gear 67 drives a gear 68 fast upon the forward end of a shaft 69, which shaft is journaled in the block 9 and the plate 10. The shaft 69 has a gear 70 fast upon the rear end thereof. The gear 70 drives a gear 71 fast upon the forward end of a shaft 72. The shaft 72 has fast upon the rear end thereof a gear 73 which drives the gear 64. The gear ratios are so chosen that the described train is effective always to compel the gear 64 to travel at one-twentieth of the rotary speed of the shaft 7.

The shafts 7 and 61 will turn in opposite directions, as illustrated. The feedback train of gearing from 7 to 64 has, therefore, been chosen to cause 64 to be driven by 7 in a direction opposite to 7 and the same as 61. The shaft 61 is desirably driven through a reversible connection to enable the shaft 7 to be driven in the same direction as the primary low power means which drives 61 or in the direction opposite thereto. Alternatively, the high torque output shaft 7 may be caused to deliver its output through a reversible gear connection.

The embodiment of the invention of Figures 1 to 8 inclusive, is useful for any feedback ratio within very wide limits. It is especially useful, however, where the speed ratio of shaft 7 to shaft 61 is high, say of the order of 20 to 1. It is not, however, as stable in operation as the embodiment of Figures 9 to 12, inclusive, for lower speed ratios of shaft 7 to shaft 61, say of the order of 2 to 1 or 1 to 5, for example. For these lower ratios the embodiment of Figures 9 to 12 is found very satisfactory, and is superior to the embodiment of Figures 1 to 8. Each is superior to the other in its own field.

In Figures 9 to 12 the main casing or housing 1a is desirably the same as the casing 1 of Figures 1 to 8. The main torque amplifier is substantially unchanged and hence corresponding reference numerals have been applied to corresponding parts with the subscript "a" added in each instance. The parts thus designated may be duplicates of the corresponding parts of Figures 1 to 8 unless a specific exception is stated herein. The plate 10a is formed with rearwardly extending posts 10b, 10c, 10d and 10e for supporting a pre-amplifier 101 and certain gearing to be described.

The pre-amplifier 101 of Figures 9 to 12 comprises upper front and rear casing members 102 and 102b, and a lower casing member 103. The casing members 102, 102b and 103 jointly define a chamber 104 which is divided into upper and lower chambers 104a and 104b by an arcuate valve plate 105 which travels in a narrow arcuate space 106 between the upper casing members 102 and 102b, on the one hand, and the lower casing member 103 on the other. The lower chamber 104b communicates through conduits 107 with the intake sides of the gear pumps so that the chamber 104b constitutes an intake or suction chamber through which oil must pass to the gear pumps.

Oil may enter the chamber 104 through a passage 108 formed in the lower end of the chamber 103 and also through the space 106 below the valve plate 105. A shaft 109 extends through the upper end of the chamber 104a and has fixed upon it a vane 110 which divides the upper chamber 104a into two chambers 104c and 104d. An arm 48a, fast upon the forward end of the shaft 109, is formed with a slot at the lower end for receiving a pin 49a carried by the valve 23a, to operate and control the valve 23a in unison with the shaft 109 and the vane 110.

The entire casing 101 is constantly submerged in oil. Oil may enter the chamber 104c through an opening 111 formed in the left-hand side of the casing member 102b as viewed in Figure 12, and oil may enter the chamber 104d through an opening 112 formed in the right-hand side of the casing member 102b.

The valve plate 105 is formed with a central rectangular aperture 113 which is somewhat wider than the thickness of the vane 110. When the vane is in the position illustrated in Figure 12, oil may flow simultaneously from the chambers 104c and 104d into the chamber 104b. The arcuate valve plate 105 is operated toward the right or left by joint action of the low power control shaft 61a and the high power output shaft 7a, to shift the aperture 113 toward the right or left, as will be explained. The openings 111 and 112 are equal in size and are appropriately proportioned to the size of the opening 108 for regulating or limiting the suction which can be developed in the chamber 104c or 104d.

Provision may desirably be made for adjusting the effective size of the opening 108 (see Figure 9) by providing a bolt 108a whose head stands across the face of the opening. The outer end of the bolt 108a is provided with a screw driver slot whereby the bolt may be turned to adjust the clearance between the head of the bolt and the lower face of casing member 101. A lock nut 108b may be employed to lock the bolt 108a in adjusted position.

Figure 12:
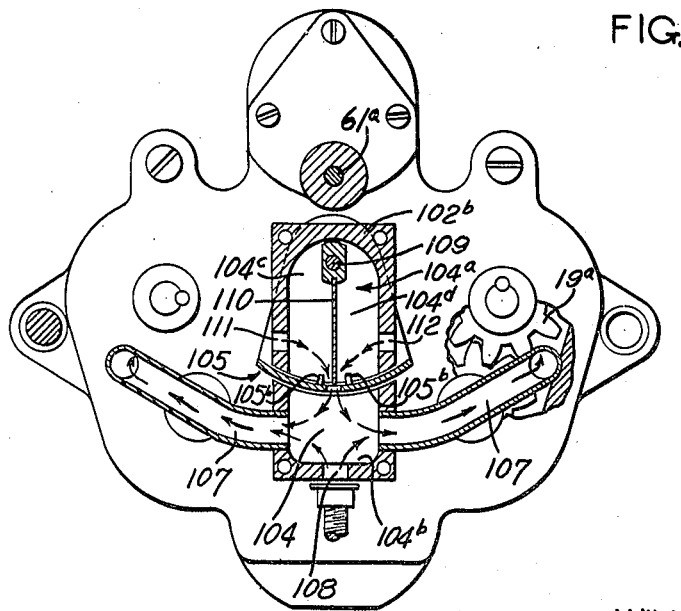
Figure 12 is a sectional view taken upon the line 12—12 of Figure 9 looking in the direction of the arrows.

Shifting of the valve plate 105 toward the left (clockwise) as viewed in Figure 12 will increase the communication of the chamber 104c with the suction chamber 104b, while diminishing communication of the chamber 104d with the suction chamber 104b. This produces an unbalance of pressures in the chambers 104c and 104d with the consequence that the vane 110 is shifted toward the left (clockwise) and caused to take up a position substantially in line with the middle of the aperture 113. Shifting of the valve plate 105 in the opposite direction from neutral, that is to the right as viewed in Figure 12, will similarly cause the vane 110 to be swung by the unbalanced oil pressures in the chambers 104c and 104d toward the right (counter-clockwise) and substantially into alignment with the middle of the aperture 113. In other words, the pressures in the chambers 104c and 104d are controlled by the position of the valve plate 105 relative to the vane, and at any time when the vane is not in alignment with the center of the aperture 113 the unbalance of pressures in the chambers 104c and 104d will tend to cause the vane to assume such a position with relation to the aperture, whether the aperture be displaced toward the right or toward the left, and whether it be displaced to a large or small degree.

Since the vane 110 is rigidly mounted on the shaft 109, and the shaft 109 is connected to operate the valve 23a in unison with itself, the position of the vane 110 will represent the position of the valve 23a. It is evident, therefore, that the position of the valve plate 105 which controls the position of the vane also controls the position of the valve 23a, and hence the direction and speed of rotation of the output shaft 7a. Two pins 105b are affixed to the valve plate 105 at opposite sides of the aperture 113 to provide stops for physically limiting displacement of the valve plate 105a relative to the vane 110.

The valve plate 105 is formed with integral supporting arms or webs 116 and 117, the respective arms being supported by ball bearings 109a upon the shaft 109 to the rear of, and in front of, the pre-amplifier casing. A pin 118 projects rearward from the arm 116 and is embraced by the lower forked end of a lever 119. The lever 119 is oscillatably mounted upon the rear end portion of a feedback shaft 65a, which shaft is driven from the high torque output shaft 7a through gears 67a, 68a, 70a and 71a, and has fast upon it a gear 64a. The lever 119 carries at its upper end a pivot pin 120 upon which a pinion 121a is revolubly mounted by means of ball bearings. The pinion 121a meshes with the gear 64a and with a gear 60a fast upon the low torque control shaft 61a.

A flanged bearing sleeve 119b is affixed to the lever 119 and supports the outer races of ball bearings 119c, the inner races of the bearings 119c being affixed to a reduced rear end portion of the shaft 65a.

It may be assumed initially that the shaft 8a is running at constant speed, that the valves 23a and 105 are in their neutral positions, and that the shafts 7a and 61a, hence the gears 64a and 60a, are stationary. If now the shaft 61a is rotated in a clockwise direction as viewed in Figures 10 and 12, the pinion 121a will be shifted to the left of the line of centers and will thereby cause the lever 119 to shift the valve plate 105 to the right, that is, in a counter-clockwise direction, so long as the gear 64a does not turn in a clockwise direction at an equal or greater speed than gear 60a. The valve 105 will be shifted by such movement of the lever 119 in a counter-clockwise direction. This causes the valve 23a to be shifted in a counter-clockwise direction, with the consequence that the shaft 7a is caused to turn clockwise.

Figure 10:
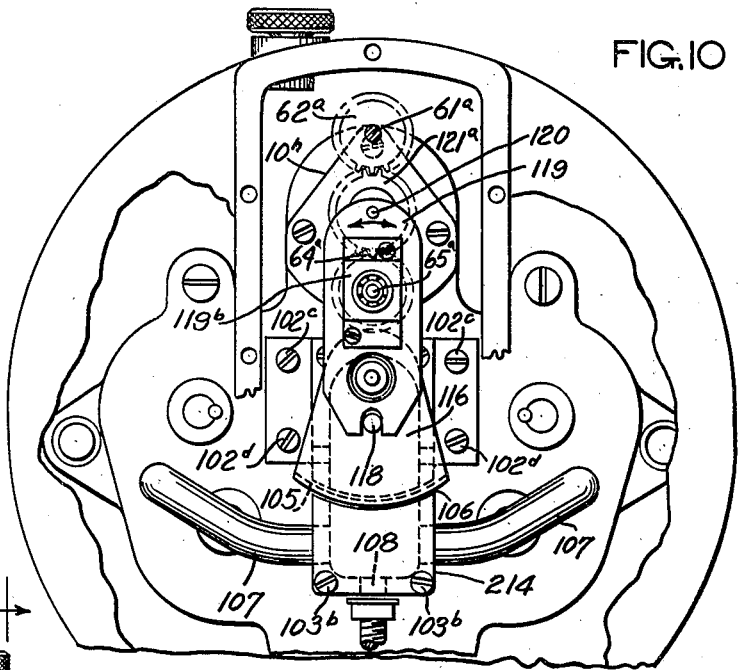
Figure 10 is a fragmentary view, partly broken away, illustrating details of the preamplifier mechanism illustrated in Figure 9.
Figure 9:
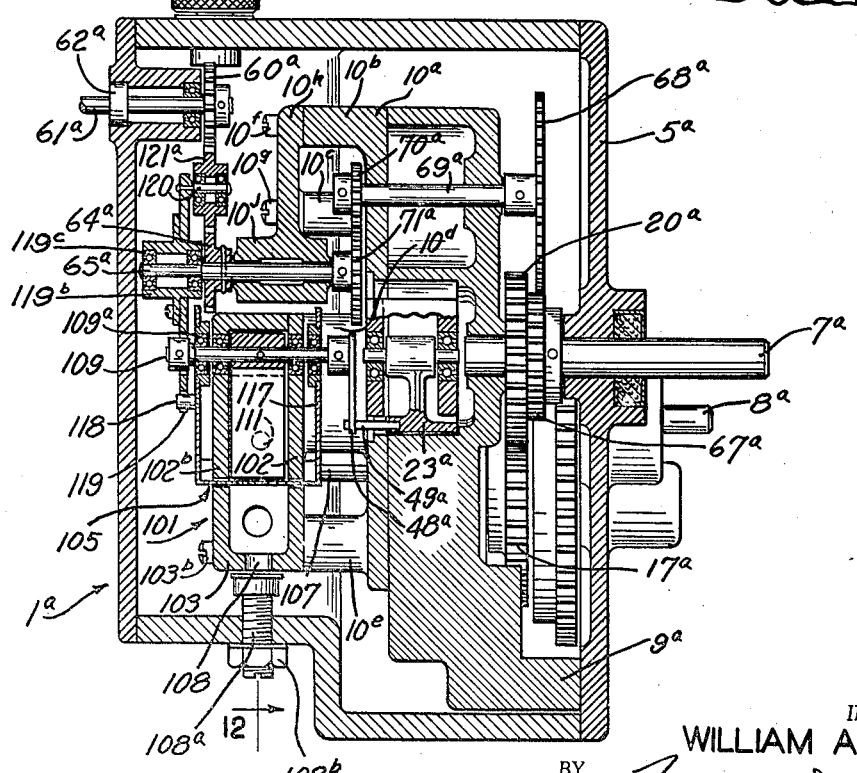
Figure 9 is a longitudinal vertical sectional view of a second form of power amplifier embodying the invention.
Figure 11:
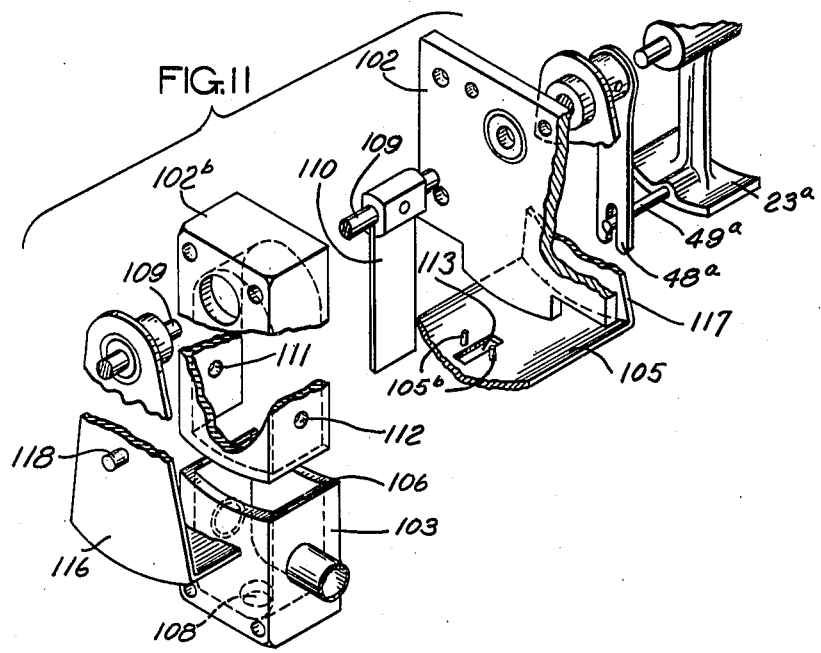
Figure 11 is an exploded perspective view showing the various features of the preamplifier of Figure 9.

Similarly, with the parts in the starting conditions described, if the shaft 61a is rotated in a counter-clockwise direction as viewed in Figures 10 and 12, the reverse effect is produced. The valve 23a is shifted in a clockwise direction, with the consequence that the shaft 7a is caused to turn counter-clockwise.

The operation and principle of control is generally similar to that which has already been described with reference to the embodiment of Figures 1 to 8, and hence no further detailed explanation of the operation is thought necessary.

The position of synchronism assumed by the valve 23a will be characteristic of the direction, speed of rotation and torque load of the shaft 7a, and the same thing will be true of the valve 105. The position assumed by each valve will be a measure of the lack of phase correspondence of the shafts 61a and 7a.

It is to be noticed that in the structure of Figs. 1 to 8 clockwise rotation of 61 results in clockwise movement of valve 23, and this produces counter-clockwise rotation of shaft 7, whereas in Figs. 9 to 12 clockwise rotation of 61a results in counter-clockwise shifting of valve 23a which produces clockwise rotation of shaft 7a. Gear 64a of Figures 9 to 12 should accordingly turn in the same direction as shaft 7a so that it will also turn in the same direction as shaft 61. The feedback gear train of Figs. 9 to 12 accordingly has no shaft corresponding to 72 and no gear corresponding to 73. The gear 71a is mounted directly on the shaft 65a, upon which the gear 64a is also made fast. As before, 61a may be driven through a reversible connection, or 7a may deliver its output through a reversible connection.

The posts 10b and 10c of the plate 10a have affixed to them by screws 10f and 10g a plate 10h which includes, integral with itself, a bearing 10j for the shaft 65a.

The forward casing member 102 extends laterally beyond the bounds of the rear casing member 102b to provide wing portions for its own support. Screws 102c and 102d are passed through these wing portions and threaded into the post 10d of the plate 10a. The casing member 103 is affixed to the posts 10e of the plate 10a by screws 103b which are passed through the casing member 103 and threaded into the said posts.

I have described what I believe to be the best embodiments of my invention. I do not wish, however, to be confined to the embodiment shown, but what I desire to cover by Letters Patent is set forth in the appended claims.

I claim:

1. A power amplifier comprising, in combination, a high torque mechanism including high power motive means and a high torque output shaft, opposed slip drive trains connecting said high power motive means with the high torque output shaft, a member operable for inversely affecting the positiveness of the trains, actuating means energized by said high power motive means for operating said member, a low torque control shaft for applying an extraneously imposed speed and direction of rotation, and control means operated jointly by the low torque control shaft and the high torque output shaft to control the operation of said actuating means and thereby to cause the high torque output shaft to assume a speed and direction of rotation dependent upon and variable with the speed and direction of rotation of the low torque control shaft.

2. A power amplifier comprising, in combination, a high torque mechanism including high power motive means and a high torque output shaft, slip drive mechanism connecting said high power motive means with the high torque output shaft, a member operable for progressively affecting the positiveness of such connecting mechanism, actuating means energized by said high power motive means for operating said member, a low torque control shaft for applying an extraneously imposed speed of rotation, and control means operated jointly by the low torque control shaft and the high torque output shaft to control the operation of said actuating means, and thereby to cause the high torque output shaft to assume a speed of rotation dependent upon and variable with the speed of rotation of the low torque control shaft.

3. A power amplifier comprising, in combination, a high torque mechanism including high power motive means and a high torque output shaft, opposed slip drive trains connecting said high power motive means with the high torque output shaft, each train including a hydraulic pump, a valve operable for inversely controlling the outlets of such pumps to vary the positiveness of said trains inversely, actuating means energized by such high power motive means for operating said valve, a low torque control shaft for applying an extraneously imposed speed and direction of rotation, and control means operated jointly by the low torque control shaft and the high torque output shaft to control the operation of said actuating means and thereby to cause the high torque output shaft to assume a speed and direction of rotation dependent upon and variable with the speed and direction of rotation of the low torque control shaft.

4. A power amplifier comprising, in combination, a high torque mechanism including high power motive means and a high torque output shaft, opposed slip drive trains connecting said high power motive means with the high torque output shaft, a member operable for inversely affecting the positiveness of the trains, actuating means energized by said high power motive means for operating said member, a low torque control shaft for applying an extraneously imposed speed and direction of rotation, and control means operated jointly by the low torque control shaft and the high torque output shaft and responsive in one ratio to the former and in a relatively reduced ratio to the latter, to control the operation of the actuating means and thereby cause the high torque output shaft to assume a direction of rotation dependent upon the direction of rotation of the low torque control shaft and to assume a speed of rotation greater than the speed of rotation of the low torque control shaft but bearing a substantially fixed ratio thereto.

5. A power amplifier comprising, in combination, a high torque mechanism including high power motive means and a high torque output shaft, opposed slip drive trains connecting said high power motive means with the high torque output shaft, each train including a hydraulic pump, a pump obstructing valve operable for inversely controlling the outlets of such pumps to vary the positiveness of said trains inversely, means providing a common intake chamber for the pumps wherein suction is maintained by the joint effect of the pumps, a valve operating device responsive to said suction, and control means for applying the suction to operate the valve selectively in one direction or the other.

6. A power amplifier comprising, in combination, a high torque mechanism including high power motive means and a high torque output shaft, opposed slip drive trains connecting said high power motive means with the high torque output shaft, each train including a hydraulic pump, a pump obstructing valve operable for inversely controlling the outlets of such pumps to vary the positiveness of said trains inversely, means providing a common intake chamber for the pumps wherein suction is maintained by the joint effect of the pumps, a valve operating device responsive to said suction, and control means for applying suction to operate the valve selectively in one direction or the other, said operating device comprising a pair of chambers separated by a movable member, and said control means comprising a control valve for connecting said chambers alternatively with the source of suction and with substantially atmospheric pressure.

7. A power amplifier comprising, in combination, a high torque mechanism including high power motive means and a high torque output shaft, opposed slip drive trains connecting said high power motive means with the high torque output shaft, each train including a hydraulic pump, a pump obstructing valve operable for inversely controlling the outlets of such pumps to vary the positiveness of said trains inversely, means providing a common intake chamber for the pumps wherein suction is maintained by the joint effect of the pumps, a valve operating device responsive to said suction, and control means for applying the suction to operate the valve selectively in one direction or the other, said operating device comprising a pair of chambers separated by a movable member, and said control means comprising a control valve for connecting said chambers alternatively with the source of suction and with substantially atmospheric pressure, a low torque control shaft for applying an extraneously imposed direction and speed of rotation, and differential means for operating the control valve comprising a first member operated by the low torque control shaft, a second member operated by the high torque output shaft, and a third member responsive to the joint effect of the first and second members and connected to the control valve.

8. A power amplifier comprising, in combination, a high torque mechanism including high power motive means and a high torque output shaft, opposed slip drive trains connecting said high power motive means with the high torque output shaft, each train including a hydraulic pump, a pump obstructing valve operable for inversely controlling the outlets of such pumps to vary the positiveness of said trains inversely, means providing a common intake chamber for the pumps wherein suction is maintained by the joint effect of the pumps, a valve operating device responsive to said suction, and control means for applying the suction to operate the valve selectively in one direction or the other, said operating device comprising a pair of chambers separated by a movable member, and said control means comprising a control valve for connecting said chambers alternatively with the source of suction and with substantially atmospheric pressure, a low torque control shaft for applying an extraneously imposed direction and speed of rotation, and differential means for operating the control valve comprising a first member operated by the low torque control shaft, a second member operated by the high torque output shaft, and a third member responsive to the joint effect of the first and second members and connected to said control valve, said control valve being constructed and arranged to close both the chambers from communication with the suction chamber and from communication with the atmosphere in an intermediate or neutral position of the control valve, and thereby to maintain the position of the pump obstructing valve unaltered.

9. A power amplifier as set forth in claim 5 which further includes means adjustable to vary the magnitude of the suction in the common intake chamber of the pumps.

10. A power amplifier as set forth in claim 5 which further includes means for yieldingly biasing the pump obstructing valve to an intermediate or neutral position.

11. A power amplifier as set forth in claim 8 in which the chambers to which suction and atmospheric pressure are applied alternatively are constantly submerged in liquid, whereby the movable operating member for the pump obstructing valve is restrained against sudden movement by said pump obstructing valve when the control valve is in or near its intermediate or neutral position.

12. A power amplifier comprising, in combination, a pair of pumps, a pump obstructing valve for inversely controlling the outlets of the pumps, means forming a common intake chamber for the pumps in which suction is maintained by the joint effect of the pumps, means responsive to said suction for operating the pump obstructing valve, and a control member for applying the suction to move the valve selectively in opposite directions.

13. A power amplifier comprising, in combination, a high power motive means, a high torque output shaft, means providing a pair of opposed hydraulic slip drives between said motive means and said shaft, an adjustable flow resistance member for progressively altering the positiveness of said drives inversely, to affect the direction and speed of rotation of the high torque output shaft, hydraulic actuating means energized by a small fraction of the available power of said high power motive means for operating said adjustable member in opposite directions, and extraneously operable low power control means requiring little operating power as compared with the adjustable member for utilizing and controlling power supplied by the high power motive means to operate said actuating means selectively in one direction or the other.

14. A power amplifier comprising, in combination, a high power motive means, a high torque output shaft, means providing a pair of opposed hydraulic slip drives between said motive means and said shaft, an adjustable flow resistance member for progressively altering the positiveness of said drives inversely, to affect the direction and speed of rotation of the high torque output shaft, an extraneously operable low power control shaft, hydraulic actuating means for said adjustable member energized by a small fraction of the available power of the high power motive means, and control means for said actuating means responsive differentially to the low power control shaft and the high power output shaft to cause the actuating means to be driven by hydraulic pressure in either direction to effect controlled operation of such adjustable flow resistance member in either direction by power supplied from the high power motive means.

15. A power amplifier comprising, in combination, a high torque mechanism including high power motive means and a high torque output shaft, opposed slip drive trains connecting said high power motive means with the high torque output shaft, each train including a hydraulic pump, a pump obstructing valve operable for inversely controlling the outlets of such pumps to vary the positiveness of said trains inversely, means providing a common intake chamber for the pumps wherein suction is maintained by the joint effect of the pumps, a valve operating device responsive to said suction, and control means for applying suction to operate the valve selectively in one direction or the other, said operating device comprising right and left-hand chambers forming parallel paths through which liquid may flow to the suction chamber, and a movable partition member dividing the right and left-hand chambers from one another and responsive to differences of pressure in the chambers to operate the pump obstructing valve, and said control means comprising an apertured valve dividing the suction chamber from said right and left-hand chambers and movable toward the right or left to adjust the position of the aperture and thereby to adjust the position of said movable partition member through the influence of said aperture upon the relative pressures in the right and left-hand chambers.

16. A power amplifier comprising, in combination, a high torque mechanism including high power motive means and a high torque output shaft, opposed slip drive trains connecting said high power motive means with the high torque output shaft, each train including a hydraulic pump, a pump obstructing valve operable for inversely controlling the outlets of such pumps to vary the positiveness of said trains inversely, means providing a common intake chamber for the pumps wherein suction is maintained by the joint effect of the pumps, a valve operating device responsive to said suction, and control means for applying suction to operate the valve selectively in one direction or the other, said operating device comprising right and left-hand chambers forming parallel paths through which liquid may flow to the suction chamber, a movable partition member dividing the right and left-hand chambers from one another and responsive to differences of pressure in the chambers to operate the pump obstructing valve, and said control means comprising an apertured valve dividing the suction chamber from said right and left-hand chambers and movable toward the right or left to adjust the position of the aperture and thereby to adjust the position of said movable partition member through the influence of said aperture upon the relative pressures in the right and left-hand chambers, a low torque control shaft, and means differentially responsive to the high torque output shaft and the low torque control shaft for operating said apertured valve.

17. A power amplifier comprising, in combination, a high torque mechanism including high power motive means and a high torque output shaft, opposed slip drive trains connecting said high power motive means with the high torque output shaft, each train including a hydraulic pump, a pump obstructing valve operable for inversely controlling the outlets of such pumps to vary the positiveness of said trains inversely, means providing a common intake chamber for the pumps wherein suction is maintained by the joint effect of the pumps, a valve operating device responsive to said suction, control means for applying a suction to operate the valve selectively in one direction or the other, said operating device comprising right and left-hand chambers through which liquid may flow in parallel paths to the suction chamber, an oscillatable vane dividing the right and left-hand chambers from one another and responsive to differences of pressure in said chambers to operate the pump obstructing valve, and said control means comprising an apertured arcuate valve plate dividing the suction chamber from said right and left-hand chambers, said valve plate being concentric with the vane axis and mounted for movement about such axis to adjust the position of the aperture and thereby to bring about a substantially corresponding adjustment of said vane through the influence of the aperture upon the relative pressures in the right and left-hand chambers.

WILLIAM A. BLACK.